(12) United States Patent
Kerai (10) Patent No.: US 11,019,037 B2
(45) Date of Patent: May 25, 2021

(54) SECURITY IMPROVEMENTS IN A WIRELESS DATA EXCHANGE PROTOCOL

(71) Applicant: Dialog Semiconductor B.V., s-Hertogenbosch (NL)

(72) Inventor: Kanji Kerai, London (GB)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 61 days.

(21) Appl. No.: 15/070,398

(22) Filed: Mar. 15, 2016

(65) Prior Publication Data

US 2017/0272405 A1    Sep. 21, 2017

(51) Int. Cl.
| | |
|---|---|
| H04L 29/06 | (2006.01) |
| G06F 13/10 | (2006.01) |
| H04L 9/32 | (2006.01) |
| H04W 4/80 | (2018.01) |
| H04W 12/06 | (2021.01) |
| H04W 12/03 | (2021.01) |

(52) U.S. Cl.
CPC ........ *H04L 63/0428* (2013.01); *G06F 13/102* (2013.01); *H04L 9/3273* (2013.01); *H04L 63/0853* (2013.01); *H04W 4/80* (2018.02); *H04W 12/03* (2021.01); *H04W 12/06* (2013.01); *H04L 2209/805* (2013.01)

(58) Field of Classification Search
CPC ............. H04L 63/0428; H04L 63/0853; H04L 9/0869; H04L 2209/24; H04W 4/008; H04W 12/02; H04W 12/06
USPC ........................................................ 713/168
See application file for complete search history.

(56) References Cited

U.S. PATENT DOCUMENTS

| | | | |
|---|---|---|---|
| 6,615,350 B1 * | 9/2003 | Schell | G06F 21/33 380/30 |
| 7,735,116 B1 | 6/2010 | Gauvin | |
| 9,204,251 B1 | 12/2015 | Mendelson | |
| 2010/0146273 A1 | 6/2010 | Kang et al. | |

(Continued)

FOREIGN PATENT DOCUMENTS

| | | |
|---|---|---|
| CN | 101662768 | 3/2010 |
| CN | 101719830 | 6/2010 |

(Continued)

OTHER PUBLICATIONS

Ping Wang, Bluetooth Low Energy—privacy enhancement for advertisement, Jun. 2014, Norwegian University of Science and Technology Department of Telematics, p. 30-35.*

(Continued)

*Primary Examiner* — Ashokkumar B Patel
*Assistant Examiner* — William B Jones
(74) *Attorney, Agent, or Firm* — Saile Ackerman LLC; Stephen B. Ackerman (57) ABSTRACT

A security solution for BLUETOOTH Low Energy (BLE) or equivalent wireless data exchange protocols involves authentication of a peripheral device by a central device using the advertising channel is presented. A method of authenticating a peripheral device in a wireless data exchange has a peripheral device sending an advertising channel Protocol Data Unit (PDU), a central device receiving the advertising channel PDU and the central device sending a scan request scanning PDU to the peripheral device. The advantage of this method of using discovery protocol enables a software based solution for the monitoring device and a hardware with software based solution on the beacon device.

8 Claims, 4 Drawing Sheets

(56) References Cited

U.S. PATENT DOCUMENTS

| | | | |
|---|---|---|---|
| 2011/0069683 A1 | | 3/2011 | Kohyama |
| 2013/0018911 A1* | | 1/2013 | Liu .................. H04L 9/3213 |
| | | | 707/769 |
| 2013/0101121 A1 | | 4/2013 | Nordholt |
| 2014/0344930 A1 | | 11/2014 | Foley |
| 2014/0361906 A1 | | 12/2014 | Hughes |
| 2015/0373749 A1 | | 12/2015 | Palin |
| 2017/0310665 A1* | | 10/2017 | Revell .................. H04L 63/061 |
| 2018/0020421 A1 | | 1/2018 | Kumar |

FOREIGN PATENT DOCUMENTS

| | | |
|---|---|---|
| CN | 104742863 | 7/2015 |
| CN | 105303651 | 2/2016 |
| KR | 20020056372 | 7/2002 |
| KR | 20070006525 | 1/2007 |
| WO | WO0113598 | 2/2001 |
| WO | WO2004010720 | 1/2004 |

OTHER PUBLICATIONS

Ping Wang, Bluetooth Low Energy—privacy enhancement for advertisement, Jun. 2014, Norwegian University of Science and Technology Department of Telematics; 1st, all (Year: 2014).*

Ping Wang, Bluetooth Low Energy—privacy enhancement for advertisement, Jun. 29014., all (Year: 2014).*

Ping Wang, Bluetooth Low Energy—privacy enhancement for advertisement, Jun. 2014, NTNU—Trondheim, all pages (Year: 2014).*

Ping Wang; Bluetooth Low Energy—privacy enhancement for advertisement; Jun. 2014; Norwegian University of Science and Technology—Department of Telematics, app pages (Year: 2014).*

Specification of the Bluetooth System: Core System Package [Host volume], vol. 3, Part H, Security Manager Specification, pp. 587-688, Dec. 2, 2014.

Specification of the Bluetooth System: Core System Package [Low Energy Controller volume], vol. 6, Part E, Low Energy Link Layer Security, pp. 166-192, Dec. 2, 2014.

"Bluetooth Low Energy—privacy enhancement for advertisement," by Ping Wang, NTNU—Trondheim Norweigian University of Sciency and Technology, Jun. 2014, pp. 1-75.

U.S. Notice of Allowance, U.S. Appl. No. 15/459,203, dated Apr. 13, 2020, First Named Inventor: Kanji Kerai, 17 pages.

U.S. Office Action, U.S. Appl. No. 15/459,203, dated Jul. 30, 2019, First Named Inventor: Kanji Kerai, 28 pages.

U.S. Office Action, U.S. Appl. No. 15/459,203, dated Nov. 16, 2018, First Named Inventor: Kanji Kerai, 28 pages.

* cited by examiner

600 — A peripheral periodically broadcasts an advertising packet with a nonce. The nonce is different in every packet.

602 — A monitoring (central) device receives a broadcasted packet and receives the nonce. Immediately after receiving the broadcasted packet the monitoring device transmits a scan request PDU (SCAN_REQ) with a second nonce.

604 — Peripheral receives the SCAN_REQ packet and the second nonce. The peripheral then calculates (in less than 150us) the function AES(Key, nonce1, nonce2) where K is the Key already stored in the peripheral. The result of the calculation called RES1 which is then transmitted back to the monitoring device in a scan response PDU (SCAN RSP), along with other application data APP_DATA.

606 — The monitoring device receives the scan response PDU and the value RES1 as well as APP_DATA. The monitoring device then compares RES1 with its own calculation result of AES(K, Tn, Mn). If the results of the comparison are equal then the monitoring device makes use of the APP_DATA and if the comparison results are not equal the monitoring device discards the APP_DATA and black lists the Beacon.

SECURITY IMPROVEMENTS IN A WIRELESS DATA EXCHANGE PROTOCOL

TECHNICAL FIELD

The present disclosure relates to security improvements in a wireless data exchange protocol, and in particular to authentication of peripheral devices.

BACKGROUND

One popular protocol for wireless data exchange is known as BLUETOOTH. In particular, the BLUETOOTH Low Energy (BLE) standard, also referred to as BLUETOOTH Smart, provides a specification for the wireless exchange of data between fixed and/or mobile devices. Its operation is defined by various standards and specifications which are managed by the BLUETOOTH Special Interest Group.

However, existing security solutions for BLE and other wireless protocols rely on devices being connected with each other. There are no ways for non-connected devices to avoid attacks such as replay, relay or man-in-the-middle attacks.

SUMMARY

According to a first aspect of the disclosure there is provided a method of authenticating a peripheral device in a wireless data exchange protocol, wherein: the peripheral device sends an advertising channel Protocol Data Unit (PDU) comprising a first nonce; a central device receives the advertising channel PDU and said first nonce and sends a scan request scanning PDU to the peripheral device, said scan request scanning PDU comprising a second nonce; the peripheral device performs an encryption function using said first and second nonces to obtain a first result and sends a scan response scanning PDU back to the central device, said scan response scanning PDU comprising said first result; the central device performs an encryption function on said first and second nonces to obtain a second result and authenticates the peripheral device if said first and second results match.

Optionally, the first and second nonces comprise random numbers.

Optionally, the central device and peripheral device are both provisioned with a key for performing the encryption function.

Optionally, the key is a 64-bit random number.

Optionally, the wireless data exchange protocol is a BLUETOOTH Low Energy protocol.

Optionally, the first nonce comprises a 64-bit, 128-bit or 256-bit random number and the second nonce comprises a 48-bit random number.

Optionally, said advertising channel PDU comprises a connectable undirected advertising event PDU or a scannable undirected advertising event PDU.

Optionally, the time between the scan request scanning PDU and the scan response scanning PDU is 150 µs or less.

According to a second aspect of the disclosure there is provided a system for wireless data exchange comprising a peripheral device and a central device arranged to authenticate a peripheral device wherein: the peripheral device is arranged to send an advertising channel PDU comprising a first nonce; a central device is arranged to receive the advertising channel PDU and said first nonce and sends a scan request scanning PDU to the peripheral device, said scan request scanning PDU comprising a second nonce; the peripheral device is arranged to perform an encryption function using said first and second nonces to obtain a first result and sends a scan response scanning PDU back to the central device, said scan response scanning PDU comprising said first result; and the central device is arranged to perform an encryption function on said first and second nonces to obtain a second result and to authenticate the peripheral device if said first and second results match.

According to a third aspect of the disclosure there is provided a method of authenticating a peripheral device in a wireless data exchange protocol, wherein the peripheral device: sends an advertising channel PDU comprising a first nonce; receives a scan request scanning PDU to the peripheral device, said scan request scanning PDU comprising a second nonce; and performs an encryption function using said first and second nonces to obtain a first result and sends a scan response scanning PDU back to the central device, said scan response scanning PDU comprising said first result.

According to a fourth aspect of the disclosure there is provided a peripheral device for use with a wireless data exchange protocol and being arranged to: send an advertising channel PDU comprising a first nonce; receive a scan request scanning PDU to the peripheral device, said scan request scanning PDU comprising a second nonce; and perform an encryption function using said first and second nonces to obtain a first result; and to send a scan response scanning PDU back to the central device, said scan response scanning PDU comprising said first result.

According to a fifth aspect of the disclosure there is provided a method of authenticating a peripheral device in a wireless data exchange protocol, wherein a central device: receives an advertising channel PDU from the peripheral device, said advertising channel PDU comprising a first nonce; sends a scan request scanning PDU to the peripheral device, said scan request scanning PDU comprising a second nonce; receives a scan response scanning PDU from the peripheral device, said scan response scanning PDU comprising a first result being derived from an encryption function using said first and second nonces; performs an encryption function on said first and second nonces to obtain a second result; and authenticates the peripheral device if said first and second results match.

According to a sixth aspect of the disclosure there is provided a central device for use with a wireless data exchange protocol and being arranged to: receive an advertising channel PDU from the peripheral device, said advertising channel PDU comprising a first nonce; send a scan request scanning PDU to the peripheral device, said scan request scanning PDU comprising a second nonce; receive a scan response scanning PDU from the peripheral device, said scan response scanning PDU comprising a first result being derived from an encryption function using said first and second nonces; perform an encryption function on said first and second nonces to obtain a second result; and authenticate the peripheral device if said first and second results match.

According to a seventh aspect of the disclosure there is provided cryptographic authentication of a peripheral device using a wireless search and discovery protocol.

BRIEF DESCRIPTION OF THE DRAWINGS

The disclosure will be described below, by way of example only, with reference to the accompanying drawings, in which.

DESCRIPTION

BLE is defined in various standards documents, including for example the "Specification of the BLUETOOTH System", Covered Core Package version 4.2, Volumes 1-7, which are hereby incorporated by reference. BLE defines two types of devices. A peripheral device is assumed to be a low-power device that exposes state or information, and a central device is a powered device with a relatively greater processing capability. Mobile devices such as smart phones or tablet computers may act as central devices if they are equipped with the appropriate hardware and software.

BLE peripherals enter an advertising mode when they are turned on. Central devices can receive the advertising protocol data units (PDUs) when they are in a scanning state.

The BLE standard uses the unlicensed 2.4 GHz spectrum. The spectrum is divided into thirty-nine 2.0 MHz-wide channels. Three channels are reserved for advertising and the remainder are reserved for data.

Figure 1:
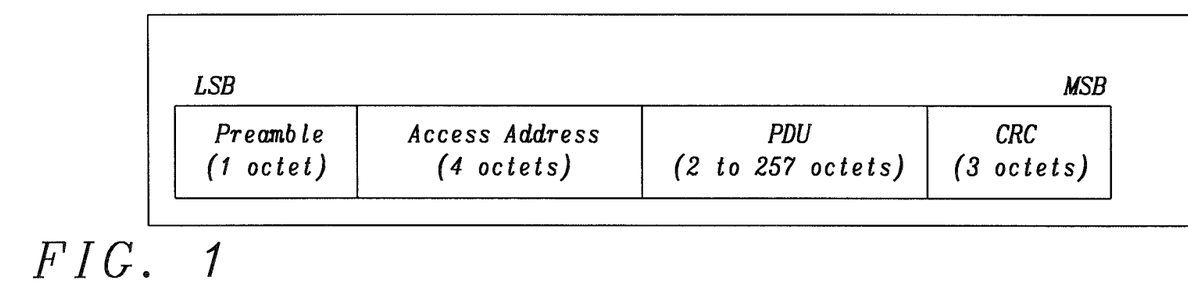
FIG. 1 shows a BLE link layer data format.

The BLE link layer defines a single packet format for both advertising and data channel packets. As shown in FIG. 1, this format specifies a preamble, an access address, a protocol data unit (PDU), and a cyclic redundancy check (CRC). The preamble is transmitted first, followed by the access address, then the PDU then the CRC.

The PDU may take various different formats. Specific advertising channel PDUs and data channel PDUs are defined depending on whether the packet is transmitted in an advertising physical channel or a data physical channel.

Figure 2:
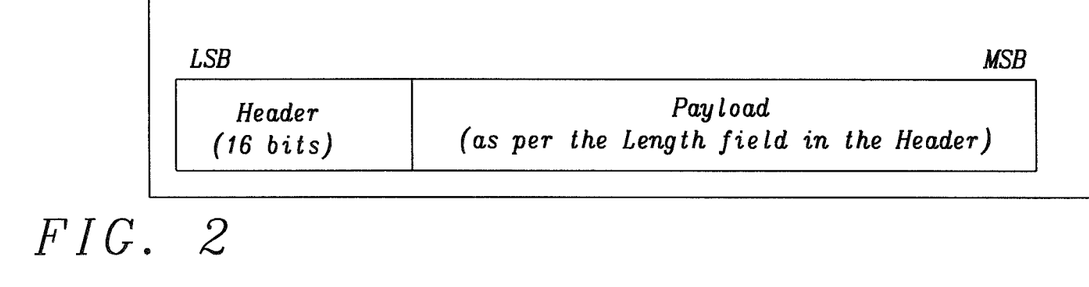
FIG. 2 shows an advertising channel PDU format.
Figure 3:
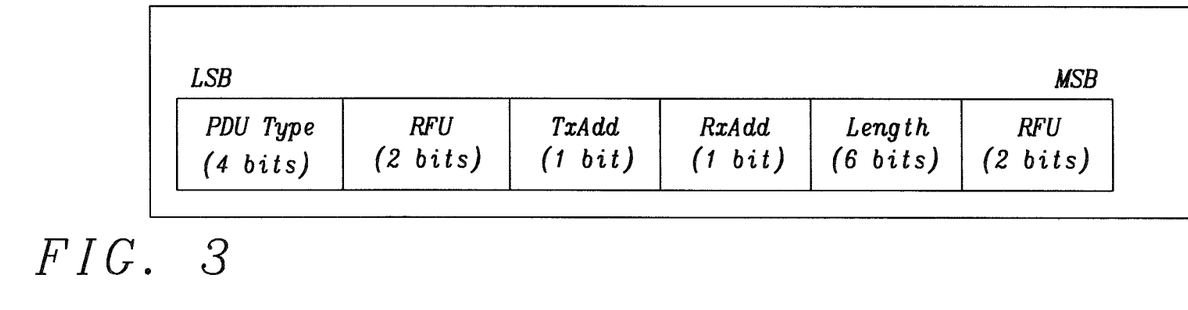
FIG. 3 shows the format of a header field of an advertising channel PDU.

The advertising channel PDU has a 16-bit header and a variable size payload, as shown in FIG. 2. The 16-bit header field of the advertising channel PDU is shown in FIG. 3.

There are various types of PDU, and the type is specified by the PDU Type field. The TxAdd and RxAdd fields contain information specific to each PDU type, and the length indicates the payload field length. There are two fields which are reserved for future use (RFU).

The advertising channel PDU types include the following, which are called advertising PDUs and are used in the specified events:
  ADV_IND: connectable undirected advertising event
  ADV_DIRECT_IND: connectable directed advertising event
  ADV_NONCONN_IND: non-connectable undirected advertising event
  ADV_SCAN_IND: scannable undirected advertising event A non-connectable event is one in which the transmission is one-way. The peripheral transmits a string of data but will not respond to any request and cannot make a connection. A connectable event is one in which the peripheral can exchange information with a central device. An undirected advertising event is broadcast and can be received by any listening central device. A directed advertising event is one which is targeted at a particular central device.

Each of the ADV_IND, ADV_SCAN_IND and ADV_NONCONN_IND PDUs has a payload with an AdvA field containing the advertiser's address and an AdvData field containing advertising data from the advertiser's host. The advertiser's address is either public or random as indicated by TxAdd. The AdvA field may contain advertising data from the advertiser's host.

The ADV_DIRECT_IND PDU has a payload with an AdvA field containing the advertiser's address and an InitA field specifying the address of the device to which the PDU is addressed. The advertiser's address is either public or random as indicated by TxAdd, and the initiator's address is either public or random as indicated by RxAdd. This packet does not contain any host data.

The advertising channel PDU types include the following, which are called scanning PDUs and are used in the following states:
  SCAN_REQ: sent by the link layer in the scanning state, received by a link layer in the advertising state.
  SCAN_RESPONSE (also referred to as SCAN_RSP): sent by the link layer in the advertising state, received by a link layer in the scanning state.

The SCAN_REQ PDU has a payload which comprises a ScanA field containing the scanner's address which is public or random as indicate by TxAdd, and an AdvA field containing the address of the device to which this PDU is directed which is public or random as indicated by RxAdd. This packet does not contain any host data.

The SCAN_RESPONSE PDU has a payload which comprises an AdvA field containing the advertiser's address which is public or random as indicate by TxAdd, and a ScanRspData which may contain any data from the advertiser's host.

An initiating advertising channel PDU, CONNECT_REQ, is also provided. This is sent by the link layer in an initiating state and received by the link layer in the advertising state.

Figure 4:
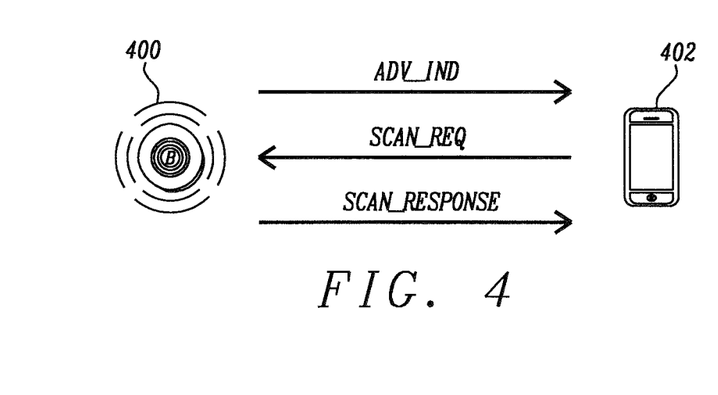
FIG. 4 illustrates the exchange of advertising channel PDUs.

FIG. 4 illustrates the exchange of advertising channel PDUs. A peripheral device 400 sends an advertisement PDU, for example, ADV_IND. A central device 402 responds with a scan request SCAN_REQ. Once this is received by the peripheral device 400, it sends a scan response advertising channel PDU SCAN_RESPONSE with data for use by the central device.

The present disclosure involves making use of this discovery procedure to implement a new security solution. This means that even non-connected devices can be protected from replay attacks, whereby a valid data transmission is maliciously or fraudulently repeated or delayed.

Figure 5:
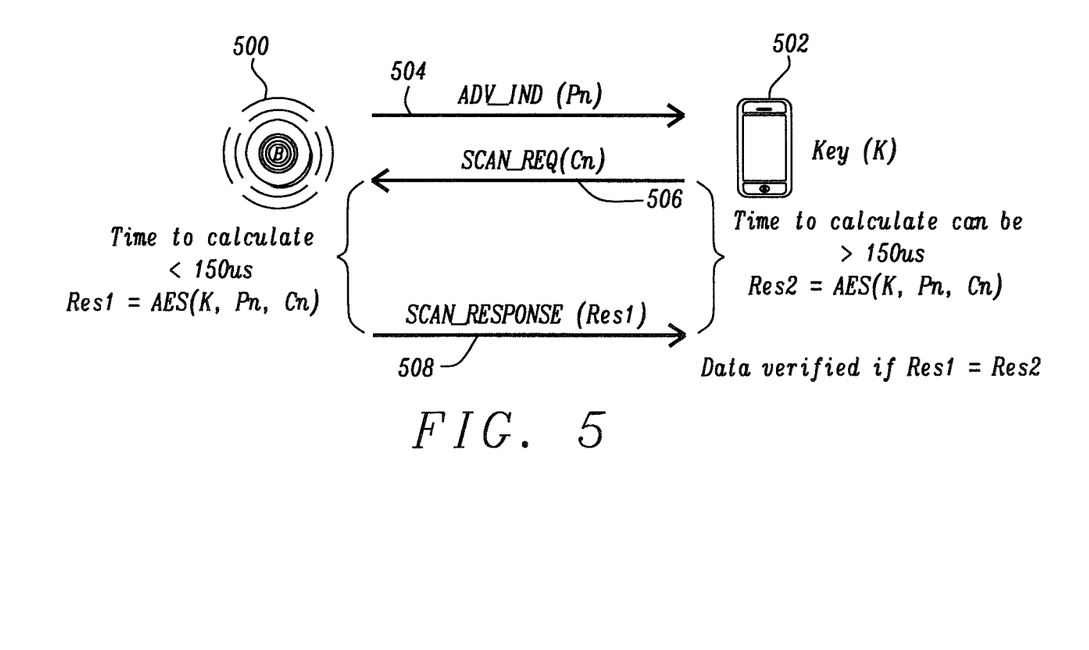
FIGS. 5 and 6 illustrate the exchange of advertising channel PDUs according to an embodiment of the disclosure.

An embodiment of the disclosure is illustrated in FIG. 5, which shows an example implementation in BLE. Here, a peripheral device 500 (P) and a central device 502 (C) exchange advertising channel PDUs in a similar fashion to the process set out in FIG. 4. However, according to the discovery process as implemented in FIG. 5, the peripheral device 500 and the central device 502 are provisioned with a shared secret key (K). This may be done by a specific application on a phone or a computer.

The peripheral device 500 transmits an advertising PDU 504 and includes as part of the payload a first nonce which comprises a random number Pn. This random number Pn is preferably different in every packet that is broadcast. It will be appreciated that the disclosure is not limited to any particular size of random number. If the central device 502 is in a scanning state it receives an advertising PDU 504 and then generates a second nonce which comprises a second random number Cn.

The central device 502 then sends a scanning PDU 506 which includes as part of its payload the second random number Cn. The peripheral device 500 then encrypts the two random numbers Pn and Cn with the key K, obtaining a result Res1. The peripheral device 500 then sends a scanning PDU 508 back to the peripheral device 502 which includes the result Res1 of the encryption, together with the other data that is associated with a host of the peripheral device 500.

The central device 502 also encrypts then decrypts the two random numbers Pn and Cn with the key K, obtaining a result Res2. It then makes a check to see if Res1 and Res2 match, and the data that it receives is verified only if there is a match. If the data is not verified, the central device 502 may discard it. The peripheral 500 may also be blacklisted, that is, its identity may be stored so that any interactions with that same peripheral device 500 in the future are ignored.

The verification means that the central device 502 can be sure that the peripheral 500 it is interacting with is a legitimate device and not an imposter device and thus provides a defense against replay attacks.

Figure 6:
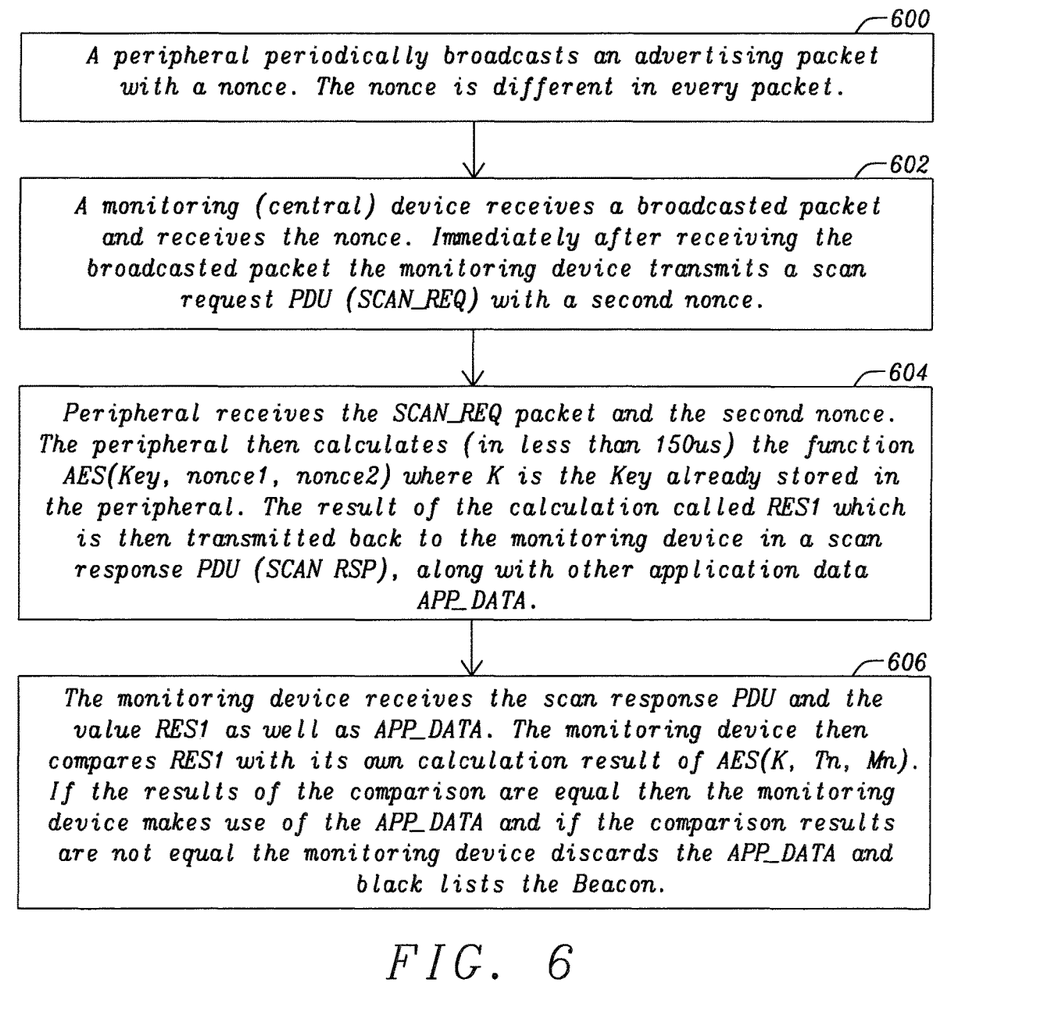

Further aspects of the process are also illustrated in FIG. 6. At step 600, a peripheral (such as a beacon) periodically broadcasts an advertising packet with a nonce. The nonce is different in every packet.

At step 602, a central device (which can also generally be called a monitoring device) receives a broadcasted packet and receives the nonce. Immediately after receiving the broadcasted packet the monitoring device transmits a scan request PDU (SCAN_REQ) with a second nonce.

At step 604, the peripheral receives the SCAN_REQ packet and the second nonce. The peripheral then calculates (in less than 150 uS) the function AES (Key, nonce1, nonce2) where K is the Key already stored in the peripheral. The result of the calculation called RES1 which is then transmitted back to the monitoring device in a scan response PDU (SCAN_RSP), along with other application data APP_DATA.

At step 606, the monitoring device receives the scan response PDU and the value RES1 as well as APP_DATA. The monitoring device then compares RES1 with its own calculation result of AES (K, Tn, Mn). If the results of the comparison are equal then the monitoring device makes use of the APP_DATA and if the comparison are not equal the monitoring device discards the APP_DATA and black lists the beacon.

The peripheral and the central device both use the same encryption function. Any suitable cryptography algorithm can be used. Any one-way hash function can be used. One possible technique is the Advanced Encryption Standard (AES). Hardware or firmware for performing this encryption method or others can be integrated together with the relevant hardware, firmware and software for implementing the BLE or other wireless data exchange.

While a symmetric key implementation has been illustrated, the disclosure can also support cryptographic algorithms which employ asymmetric keys. In those embodiments which employ asymmetric keys, the peripheral device 500 and central device 502 of FIG. 5 could exchange a public key and use private keys to encrypt and decrypt the random numbers which are generated.

Figure 7:
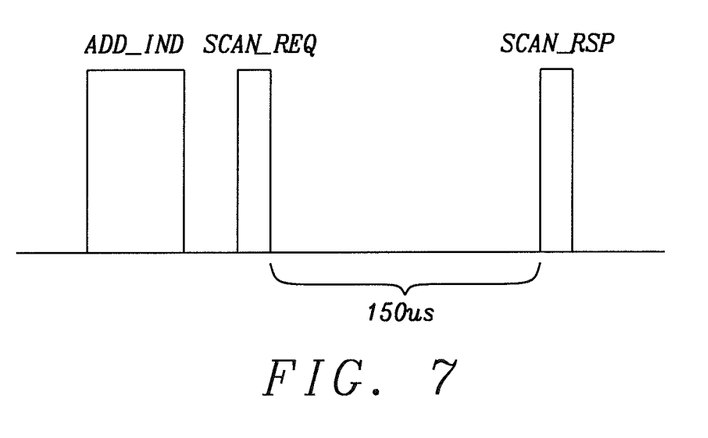
FIG. 7 illustrates the timing of the exchange of advertising channel PDUs in the process illustrated in FIGS. 5 and 6.

The disclosure is not limited to any specific format for the first and second random numbers Pn, Cn and the symmetric key K, but for purposes of illustration, a suitable specification of these numbers for the purposes of a BLE implementation may be as follows:

The first random number Pn transmitted in the advertising PDU 504 could satisfy one, more or all of the following requirements:
   The random number shall have no more than twelve consecutive zeros or ones
   The random number shall not be a sequence that differs from the previous random number by only one bit
   The random number shall not have all eight octets equal
   The random number shall have no more than 48 transitions
   The random number shall have a minimum of four transitions in the most significant twelve bits The key K shared by the peripheral device 500 and the central device 502 could satisfy one, more or all of the following requirements:
   The Key shall have no more than twelve consecutive zeros or ones
   The Key shall not have all eight octets equal
   The Key shall have no more than 48 transitions
   The Key shall have a minimum of four transitions in the most significant twelve bits The second random number Cn transmitted in the response scanning PDU 508 could for example be a 48-bit random number. This size is compatible with BLE specifications, for example version 4.0 specifies a SCAN_REQ packet with the first 48 bits being the central device's address and the following 48 bits as being the peripheral's address. The number Cn could satisfy one, more or all of the following requirements:
   The random number shall have no more than nine consecutive zeros or ones
   The random number shall not be a sequence that differs from the previous random number by only one bit
   The random number shall not have all six octets equal
   The random number shall have no more than 36 transitions
   The random number shall have a minimum of four transitions in the most significant nine bits As shown in FIG. 7, the BLUETOOTH specification requires the transmission of a scan response PDU within a set time limit from the transmission of a scan request. In the case of BLUETOOTH 4.0, the required time is 150 μs.

The present disclosure makes the necessary calculations (of Res1, Res2) within this time period, and indeed within 1 ms. The time taken to perform the calculations depends on the choice of the random numbers Pn, Cn and the key K, as well as the speed of the hardware, firmware and software that is used for carrying out the calculations. The above specific example illustrates exemplary choices of Pn, Cn and K that will enable rapid calculation with most available device implementations.

Complying with this time limit helps guard against relay attacks (where communication with both sides is initiated by an attacker who relays messages between the two sides) and against man-in-the-middle attacks (where an attacker intercepts and manipulates communications between two parties which are initiated by one of the parties), because both of these attacks require time from an adversary in order to be implemented.

The embodiment of FIG. 5 is illustrated with a connectable undirected advertising event PDU, ADV_IND. However, the disclosure may also function with a scannable undirected advertising event ADV_SCAN_IND.

Also there are various PDU types defined by an advertising PDU header which are reserved, and the disclosure may make use of these reserved types.

The peripheral device may in a preferred embodiment be a beacon, for example an iBeacon® as provided by Apple Computer Inc.

Consider a use case where a Beacon (B) is attached to an asset (e.g. blood measuring equipment in a hospital). An asset manager can monitor on a monitoring device (e.g. a mobile phone) the position of the asset by receiving the broadcast data from the beacon. The asset manager needs to be confident that the data received is from a valid and authorized beacon and not from a hacking device (performing a replay attack). The present disclosure explains how security in the beacon can be implemented.

Consider that the beacons are provisioned with a secret key K before they are attached to assets in a hospital. The provisioning of beacons can be done by a specific application on a mobile phone or on another computer. The key should be randomly generated by the provisioning master. It is also possible to provision additional auxiliary masters using a similar mechanism to the original provisioning process, so that multiple authorized monitoring devices can be provided with the security functions of the disclosure for a given set of beacons which share the same key.

When the beacons are attached to assets, the beacons periodically broadcast a set of known data (e.g. Asset ID, Co-ordinates of the position of the beacon, etc). A monitoring device (M) (e.g. a mobile phone or a gateway) with a specific application can be used to receive data from all the beacons. The application may periodically receive data from the beacons. The device M checks the security of each beacon to check that the beacon is a legitimate device and not a hacking device. By checking the security of each beacon, the monitoring device ensures that the information received from the beacon is reliable and secure.

The additional advantages of the invention include the following:
1. Using the discovery protocol enables a software based solution for the monitoring device and a hardware with software based solution on the beacon device. A beacon with suitable hardware may only require software changes to support the security solution.
2. The new data set for the security solution used in the discovery protocol is simple and easier to support.
3. The security solution can support one monitoring device to many beacons because it is fast (less than 1 milisecond).
4. The security solution is a much lower power solution than a connection based security solution.

Various modifications and improvements can be made to the above without departing from the scope of the disclosure.

What is claimed is:

1. A method of authenticating a peripheral device in a wireless data exchange protocol during an exchange of advertising channel messages between the devices, by verifying that a peripheral device and a central device both possess copies of the same pre-stored common symmetric key; wherein
the peripheral device:
sends an advertising channel PDU comprising a first nonce;
receives a scan request scanning PDU from the central device, said scan request scanning PDU comprising a second nonce;
responsively and automatically upon receipt of the scan request scanning PDU performs an encryption function directly on both said first and second nonces with said pre-stored common symmetric key stored at said peripheral device to obtain a first result;
sends a scan response scanning PDU back to the central device, said scan response scanning PDU comprising said first result;
and the central device:
receives the advertising channel PDU and said first nonce from the peripheral device;
sends a scan request scanning PDU to the peripheral device, said scan request scanning PDU comprising said second nonce;
responsively and automatically upon receipt of the advertising channel PDU performs an encryption function directly on both said first and second nonces with said pre-stored common symmetric key stored at said central device to obtain a second result;
receives the scan response scanning PDU back from the peripheral device, said scan response scanning PDU comprising said first result; and
authenticates the peripheral device if said first and second results match.

2. The method of claim 1, wherein the first and second nonces comprise random numbers.

3. The method of claim 2, wherein the key is a 64-bit random number.

4. The method of claim 1, wherein the wireless data exchange protocol is a Bluetooth Low Energy protocol.

5. The method of claim 4, wherein the first nonce comprises a 64-bit, 128-bit or 256-bit random number and the second nonce comprises a 48-bit random number.

6. The method of claim 4, wherein said advertising channel PDU comprises a connectable undirected advertising event PDU or a scannable undirected advertising event PDU.

7. The method of claim 1, wherein the time between the scan request scanning PDU and the scan response scanning PDU is 150 μs or less.

8. A system for wireless data exchange comprising a peripheral device and a central device arranged to authenticate a peripheral device during an exchange of advertising channel messages between the devices, by verifying that a peripheral device and a central device both possess copies of the same pre-stored common symmetric key; wherein
the peripheral device is arranged to:
send an advertising channel PDU comprising a first nonce;
receive a scan request scanning PDU from the central device, said scan request scanning PDU comprising a second nonce;
responsively and automatically upon receipt of the scan request scanning PDU to perform an encryption function directly on both said first and second nonces with said pre-stored common symmetric key stored at said peripheral device to obtain a first result;
send a scan response scanning PDU back to the central device, said scan response scanning PDU comprising said first result;
and the central device is arranged to:
receive the advertising channel PDU and said first nonce from the peripheral device;
send a scan request scanning PDU to the peripheral device, said scan request scanning PDU comprising said second nonce;
responsively and automatically upon receipt of the advertising channel PDU perform an encryption function directly on both said first and second nonces with said pre-stored common symmetric key stored at said central device to obtain a second result;
receive the scan response scanning PDU back from the peripheral device, said scan response scanning PDU comprising said first result; and
authenticate the peripheral device if said first and second results match.

\* \* \* \* \*